United States Patent [19]

Shimizu et al.

[11] Patent Number: 4,758,391
[45] Date of Patent: Jul. 19, 1988

[54] METHOD FOR CONTROLLING BACK PRESSURE IN ELECTRICALLY-OPERATED INJECTION APPARATUS

[75] Inventors: Miyuki Shimizu; Yoshihiko Yamazaki, both of Sakakimachi, Japan

[73] Assignee: Nissei Plastics Industrial Co. Ltd., Sakakimachi, Japan

[21] Appl. No.: 821,434

[22] Filed: Jan. 22, 1986

[51] Int. Cl.⁴ .............................................. B29C 45/77
[52] U.S. Cl. ................... 264/40.5; 264/40.1; 264/328.1; 425/145; 425/149
[58] Field of Search ............... 264/40.5, 40.3, 297.2, 264/328.1, 335, 40.1; 425/145, 149

[56] References Cited

U.S. PATENT DOCUMENTS

| | | | |
|---|---|---|---|
| 3,721,512 | 3/1973 | Ma et al. | 425/149 |
| 4,146,601 | 3/1979 | Bishop | 425/145 |
| 4,540,359 | 9/1985 | Yamazaki | 425/135 |
| 4,579,515 | 4/1986 | Kawaguchi et al. | 425/149 |

Primary Examiner—Jan H. Silbaugh
Assistant Examiner—James Bartholomew

[57] ABSTRACT

A method for controlling back pressure in an electrically-operated injection apparatus wherein rotation and forward movement of an injection plunger within an injection heating tube are carried out by a first electric motor which provides a driving force, wherein backward motion of the injection plunger during the charging of material presses against a screw threaded rotatable part and is thereby converted into rotational motion of the threaded rotatable part, and wherein the rotational motion is controlled to control back pressure of the injection plunger. A second electric motor is used for controlling the back pressure on the injection plunger by controlling rotation of the threaded rotatable part. The backward force exerted on the injection plunger or the direct pressure of the molten material within the injection heating tube are electrically measured. By driving and controlling the second motor through feedback control, the back pressure is made to coincide with a set, preselected back pressure value.

10 Claims, 3 Drawing Sheets

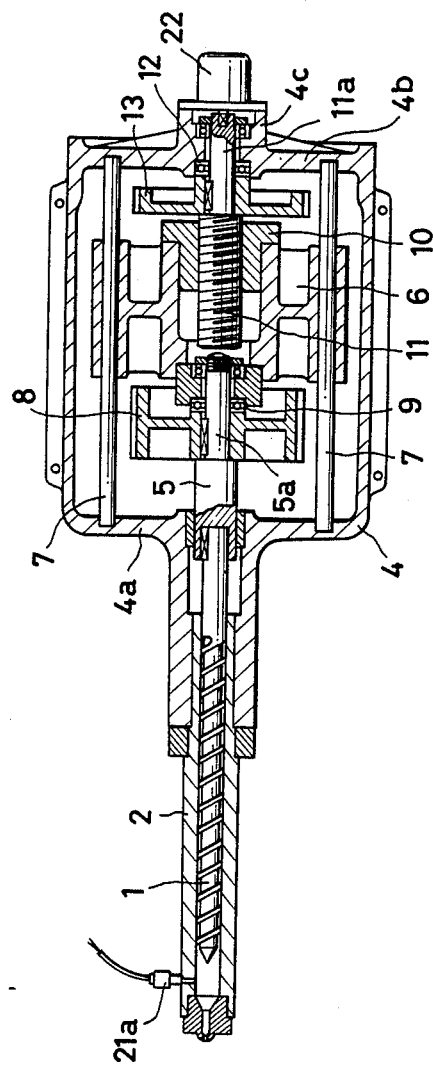

METHOD FOR CONTROLLING BACK PRESSURE IN ELECTRICALLY-OPERATED INJECTION APPARATUS

FIELD OF THE INVENTION

This invention relates to a method for controlling back pressure in an injection apparatus which forms a part of an injection molding machine used to mold a synthetic resin and which is operated by an electric motor to charge and inject the material.

BACKGROUND OF THE INVENTION

U.S. Pat. No. 4,540,359 discloses an injection molding machine which includes an injection mechanism driven by means of an electric motor rather than a hydraulic means. To control back pressure of the inspection plungers, this patent provides of an electrically-operated brake.

The use of an electrically-operated brake, makes it necessary to provide several components including a screw shaft for forwardly moving the injection plunger, a movable member threadedly engaged with the screw shaft to convert the rotational force into axial thrust of the injection plunger, and related components which are provided between the plunger and the back pressure control device. As a result of this structure backward force from the injection plunger received by the back pressure control device is indirect and the frictional force between the recited members degrades the accuracy with which the back pressure can be controlled.

SUMMARY OF THE INVENTION

It is an object of the present invention to solve these problems in the prior art. Another object of the invention is to provide a new method in which an electric motor is used as a back pressure control means, and a feedback control and a rotating force of the electric motor may be utilized to thereby control back pressure in the injection plunger with excellent responsiveness and high accuracy.

Another object of the invention is to provide a back pressure control method which comprises the steps of: electrically measuring a strain developing on a part receiving a thrust generated as a reaction of a backward force of the injection plunger or molten resin pressure to detect back pressure, and driving and controlling the electric motor by feedback control so that back pressure is made to with a set value by a differential current between the back pressure and the set back pressure.

BRIEF DESCRIPTION OF THE DRAWINGS

FIG. 4 is a sectional view of the injection apparatus on which is mounted a resin sensor for detecting resin pressure used for detecting back pressure.

FIG. 5 is a block diagram of a back pressure control circuit.

DESCRIPTION OF THE PREFERRED EMBODIMENT

Figure 1:
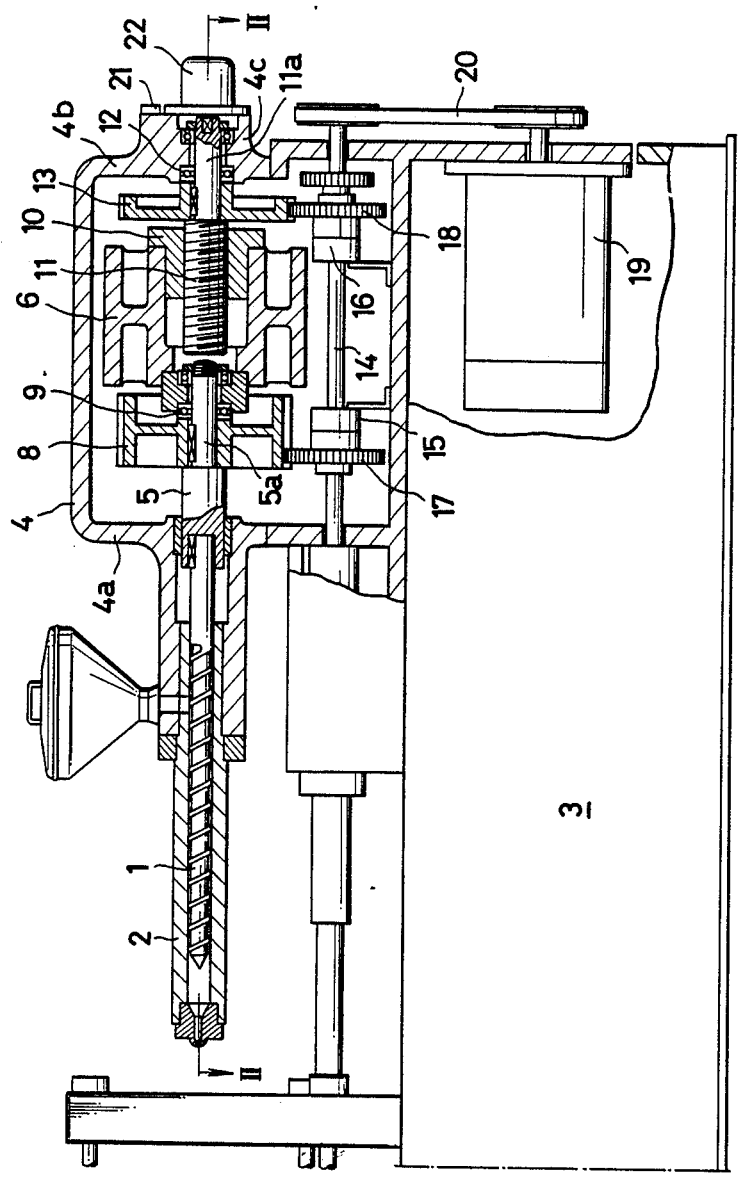
FIG. 1 is a side view of a part of a molding machine showing in longitudinal section an injection apparatus capable of carrying out the back pressure control method in accordance with the present invention.
Figure 2:
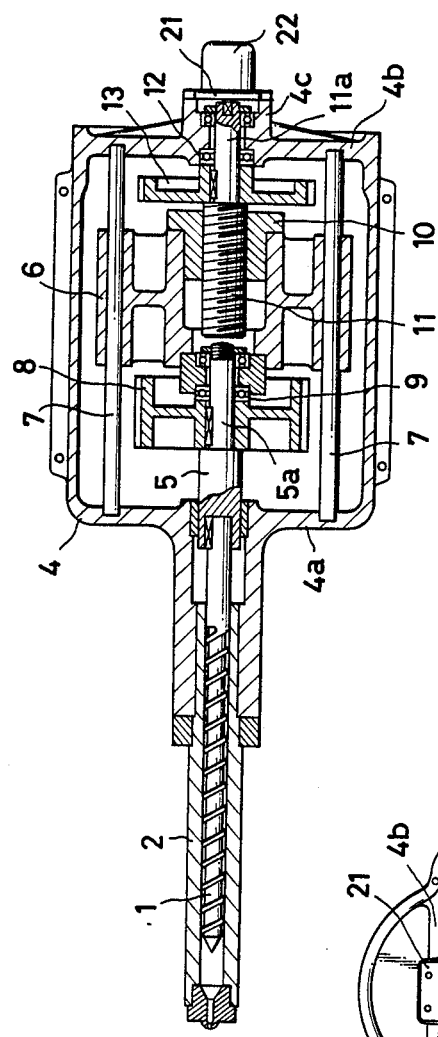
FIG. 2 is a sectional view taken along line II—II of FIG. 1.
Figure 3:
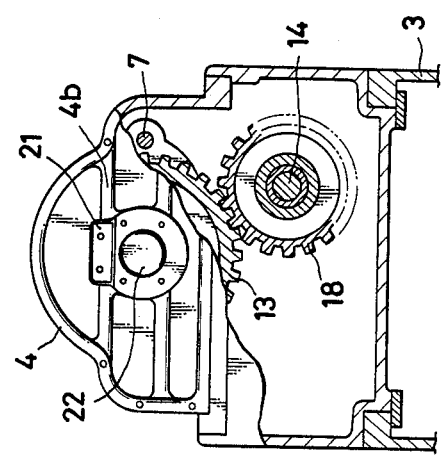
FIG. 3 is a rear view of the injection apparatus with a part thereof cutaway.

The injection apparatus of the preferred embodiment illustrated in FIGS. 1–5 comprises an injection heating tube 2 containing an injection plunger 1 having screw threads provided in the outer periphery thereof and a housing 4 supported on a machine bed 3 which also serves to support the injection heating tube 2. The housing 4 houses a movable member 6 connected to the rear end of injection plunger 1 through a rotary shaft 5 and support shafts 7, 7' (FIG. 2) located on opposite sides of the movable member 6. shafts 7,7' are mounted on the front and rear walls 4a and 4b of housing 4 parallel to the rotary shaft 5. The movable member 6 is mounted on support shafts 7 and 7' so that the movable member 6 may be slidably moved in a lateral direction.

A small-diameter extending shaft 5a having a gear 8 for rotating the plunger 1 is projectingly provided at the rear end of the rotary shaft 5. The movable member 6 is connected to the end of the shaft 5a through a thrust bearing 9.

A central portion of movable member 6 is cylindrically shaped, and a thread receiving member 10 having threads (not shown) formed in the inner peripheral surface thereof is fitted into the rear end of said central portion. A screw shaft 11 is screwed into the member 10 concentric with the injection plunger 1.

The rear end of the screw shaft 11 constitutes a shaft portion 11a rotatably retained on a bearing portion 4c of the rear wall 4 of the housing by means of a thrust bearing 12. A gear 13 is mounted on the shaft portion 11a.

As best shown in FIG. 1, gears 8 and 13 mesh with gears 17 and 18, respectively, which are mounted on a transmission shaft 14 located interiorly and on the underside of housing 4. The transmission shaft 14 and a driving shaft of a DC electrically-operated servo-motor 19 connected to the underside surface of housing 4 are connected through a driving belt 20 so that the servo-motor 19 may be used as a driving source to rotate and axially move the injection plunger 1.

A strain gage 21 measures the amount of deformation of the rear wall 4b of the housing. The strain gage is mounted on a part which senses the reaction produced when the injection plunger 1 charges the molding material at which time the shaft portion 11a places a rearward force on the bearing portion 4c of the rear wall 4b of the housing 4.

A DC electric motor 22 is provided for controlling the back pressure of the plunger 1 produced when the injection plunger 1 charges the molding material into the mold (not shown). The electric motor 22 is secured to the bearing portion 4c.

While the back pressure control device in this embodiment is a DC servo-motor, it is to be understood that the device can be an electric motor capable of controlling torque, for example, an AC servo-motor, a hysteresis motor, a torque motor, etc.

The strain gage 21 is commercially available as a mold type strain gage, in which the strain gage is molded into a plastic casing and fixed to the bearing portion 4c by means of a screw.

Rotation and the resultant backward movement of the injection plunger 1 which occurs during charging of the molding material is caused by the rotation of gears 17 and 8. Forward movement of injection plunger 1 is carried out by rotation of gears 18 and 13.

When the injection material is to be charged; the rotary shaft 5 is rotated by rotation of the gear 8 causing the injection plunger 1 to be rotated so that the material from a hoppr 30 is transported to the foremost end of the heating tube 2 by means of the screw threads. in response to the forward movement of the molding material when the plunger 1 is rotated, a backward force is generated on the plunger 1 and is transmitted to the thread receiver member 10 through the moveable member 6. This backward force is essentially equal and opposite to the forward force placed on the forwardly moving molding material and is further exerted on screw shaft 11 to generate in the screw shaft 11 a rotating force in the clockwise direction as viewed in FIG. 3. To control this backward force (and thereby control the forward force applied to the molding material), the electric motor 22 is driven in a controlled manner to impose a counterclockwise rotational force on screw shaft 11. The rotational force acts as a braking force on the screw shaft 11 and ensures that molding material will be charged in a controlled manner with a desired back pressure (back pressure of plunger 1).

The thrust is generated as a reaction to the back pressure on the screw shaft 11. The aforesaid back pressure is carried along the rear wall 4b of the housing through the thrust bearing 12. As a consequence, the stress is also applied to the rear wall 4b of the housing, and a minute deformation corresponding to the back pressure is produced in the bearing portion 4c mounted on the strain gage 21. The amount of deformation is electrically measured by the strain gage 21 and considered to represent the back pressure.

The aforementioned detection of back pressure is effected by use of the backward force (thrust) of the injection plunger 1 when the material is being charged. On the other hand, the example shown in FIG. 4 shows a case where pressure of molten molding material (a resin) is detected by a resin pressure sensor 21a mounted on the foremost end of heating tube 2, and the aforesaid molten resin pressure is used for deriving a back pressure measured value.

The method of the present invention for controlling back pressure will be described with reference to FIG. 5.

The back pressure measured by strain gage 21 is amplified by strain amplifier 23 and an electric current $I_2$ corresponding to the back pressure is produced.

A differential electric current $\Delta I$ is obtained by adding an electric current $I_1$ corresponding to back pressure set by a back pressure setting unit 24 and the measured back pressure current $I_2$ in an adder 25. The differential current is amplified by amplifier 26 and supplied to power converter 27. Power converter 27 comprises an ignition control circuit which uses a thyristor or a transistor based pulse width control circuit and supplies an armature corresponding to an amplifying current to be inputted to the DC electric motor 22. To control back pressure, motor 22 is controlled by feedback control to assume the set preselected value of back pressure. The back pressure is thus controlled to a high degree of accuracy.

While in the present embodiment, a servo-motor is provided for the purpose of injection and rotation, and another electric motor is used exclusively for back pressure control, it is to be understood that the servo-motor for injection can also be used for back pressure control and a motor for rotating of the plunger can be separately provided.

INDUSTRIAL APPLICABILITY

As described above, according to the present invention, an electric motor is used for controlling back pressure. The electric motor is driven and controlled by feedback control so that the achieved back pressure virtually coincides with the set value of control back pressure. Therefore, the device is not affected by the frictional force of the transmission mechanism thus providing excellent responsiveness and high accuracy of back pressure control. In addition, the back pressure control may be carried out with high accuracy according to material to be molded or articles to be molded. Therefore, the apparatus of the present invention may be applied as an optimum back pressure controlling method for the injection apparatus, using an electric motor as a driving source.

What is claimed is:

1. A method for controlling back pressure in an electrically-operated injection apparatus, the method comprising the steps of:
    introducing a material to be molded into a tube having an injection plunger therein and rotating the injection plunger to move the material forward in the tube, the injection plunger moving in a backward direction with respect to the tube in response to a back pressure developing from the material being moved forward in the tube;
    coupling the injection plunger to a rotatable part in a manner which is effective to rotate the rotatable part in response to the backward movement of the injection plunger; and
    sensing the instantaneous value of the back pressure and applying to the rotatable part a braking force which is responsive to the instantaneous back pressure and which is effective to regulate the backward movement of the injection plunger for causing the back pressure in the material to coincide with a preselected back pressure value.

2. The method of claim 1, wherein the step of sensing the instantaneous value of back pressure includes the step of sensing the strain imparted to a portion of the apparatus which receives thrust produced in the rotatable part in reaction to the back pressure exerted on the injection plunger and producing a strain signal representative of the strain.

3. The method of claim 2, including the step of receiving the strain signal and a back pressure set signal which represents the preselected back pressure value and combining the signals to produce a feedback output which is operative for controlling the braking force.

4. The method of claim 3, in which the feedback output is applied to a back pressure control motor which is coupled to the rotatable part and which is operable by the feedback output to apply the braking force to the rotatable part.

5. The method of claim 3, comprising the step of adding the strain signal and the back pressure set signal to produce the feedback output.

6. The method of claim 1, further comprising coupling the injection plunger to a gear which is rotatable independently of the rotatable part and rotating the gear via a transmission which is driven by a main driving electrical motor.

7. The method of claim 1, wherein the rotatable part comprises a screw shaft and wherein the screw shaft and the injection plunger are generally disposed in line with one another.

8. The method of claim 7, further comprising the step of driving the screw shaft, during a molding phase of the apparatus, in a direction for causing forward movement of the injection plunger in order to drive the material from the tube into a mold.

9. The method of claim 4, wherein the back pressure controller motor is exclusively operated for the task of braking the rotation of the rotatable part.

10. The method of claim 1, comprising sensing the instantaneous back pressure directly at the material in the tube.

* * * * *